Dec. 4, 1956  J. F. CAMPBELL  2,772,736
ROLLER DIE CUTTER
Filed May 4, 1953  4 Sheets-Sheet 1

INVENTOR.
JOHN J. CAMPBELL
BY
Oldham & Oldham
ATTORNEYS

Dec. 4, 1956        J. F. CAMPBELL        2,772,736
ROLLER DIE CUTTER

Filed May 4, 1953        4 Sheets-Sheet 3

INVENTOR.
JOHN J. CAMPBELL
BY Oldham & Oldham
ATTORNEYS

Dec. 4, 1956  J. F. CAMPBELL  2,772,736
ROLLER DIE CUTTER

Filed May 4, 1953  4 Sheets-Sheet 4

INVENTOR.
JOHN J. CAMPBELL
BY Oldham & Oldham
ATTORNEYS

United States Patent Office 2,772,736
Patented Dec. 4, 1956

2,772,736

ROLLER DIE CUTTER

John F. Campbell, Cuyahoga Falls, Ohio

Application May 4, 1953, Serial No. 352,651

10 Claims. (Cl. 164—226)

This invention relates to die cutting apparatus, especially to apparatus of the type wherein a roll is provided for being moved over a die for cutting material placed on the die.

Heretofore there have been various types of die cutting apparatus provided and some of such apparatus has used cylinderical rollers movable over sheet material layed against the cutting edge of a die for progressively cutting the sheet material to the shape of the dies used. However, in apparatus of this type, it has been difficult to obtain a satisfactory cut through any relatively thick material being cut as the surfaces are not normal to the flat surface of the material being cut. Also, in cutting relatively wide sheets of material by use of relatively wide dies having straight edge portions therein lying parallel to the axis of the roller, it has been difficult to obtain a sharp, accurate cutting action along such wide or long die edge surface.

The apparatus of the invention may be used for cutting any types of material, such as rubber sheets, a plurality of laminations of paper or cloth, layers of cotton, foam rubber sheets, etc.

The general object of the present invention is to provide a novel, improved roller die cutter characterized by its ability to cut a plurality of laminations of material, or relatively thick material and provide cut edges normal to the surfaces of the material being cut.

Another object of the invention is to provide a roller die cutter wherein a scissors-like cutting action can be secured betwen a roll of the die cutter and an associated die having a straight cutting edge therein.

Yet another object of the invention is to provide a new type of die cutter apparatus wherein a die positioning assembly is provided in the apparatus, which die positioning assembly comprises a flat metal base plate, a rubber pad support layer, and a flatly ground top plate on which the cutting dies used in the apparatus are positioned.

Another important object of the invention is to provide a surface speed for the roller used to press material against the cutting die slightly faster than the actual forward motion or rolling speed of the roller longitudinally of the apparatus and over the surface of the material being cut.

Other and more specific objects of the invention are to provide a movable roller in a roller type of a die cutter wherein the roll travels at an angle of from about 5° to 10° off the parallel with the longitudinal axis of the die support plate; to use a hardened and ground roll in the roller type die cutter apparatus; to provide adjustable height means for positioning the roller in the die cutter apparatus; to provide special carriage means for engaging the roller with positioning frame means for longitudinal movement of the apparatus in predetermined relationship to the remainder of the apparatus; and to provide relatively uncomplicated roller die cutter apparatus which has easily operated drive means provided for moving the roll longitudinally of the apparatus.

The roller die cutter apparatus of the invention primarily comprises a roller with gears operatively engaged with the ends of the roll, a frame, a flat surfaced top plate for carrying a die positioned by the frame, rack means for engaging the gears on the roller, which rack means position the roller for movement in a direction parallel to the longitudinal axis of the frame, and means for engaging the roller to rotate it and cause it to roll along the rack means and move longitudinally along the longitudinal axis of the frame above the top plate to engage any dies thereon. The roller has a larger outer diameter than the pitch diameter of the gear means used for driving the roller along the frame, and as a feature of the invention, the top plate is positioned with its longitudinal axis at an angle of from about 5° to 10° with the longitudinal axis of the frame whereby dies positioned on the top plate will have a scissors-like cutting action on any straight die edges normal to the longitudinal axis of the top plate.

The foregoing and other objects and advantages of the invention will be made more apparent as the specification proceeds.

For a better understanding of the principles of the invention, reference should be had to the accompanying drawings wherein one currently preferred embodiment of the invention is illustrated, and wherein.

Figure 3:
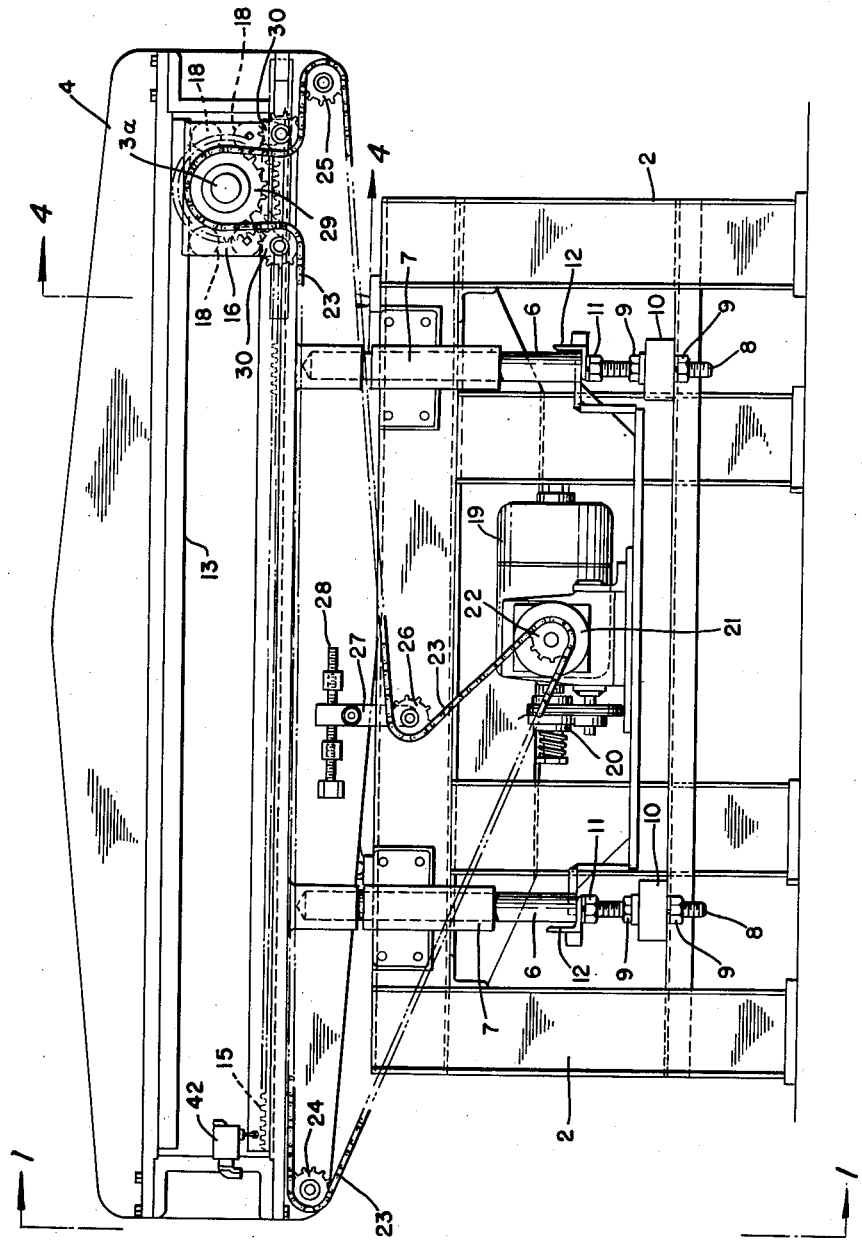
Fig. 3 is a side elevation of the apparatus of Fig. 1 taken on line 3—3 of Fig. 1.
Figure 4:
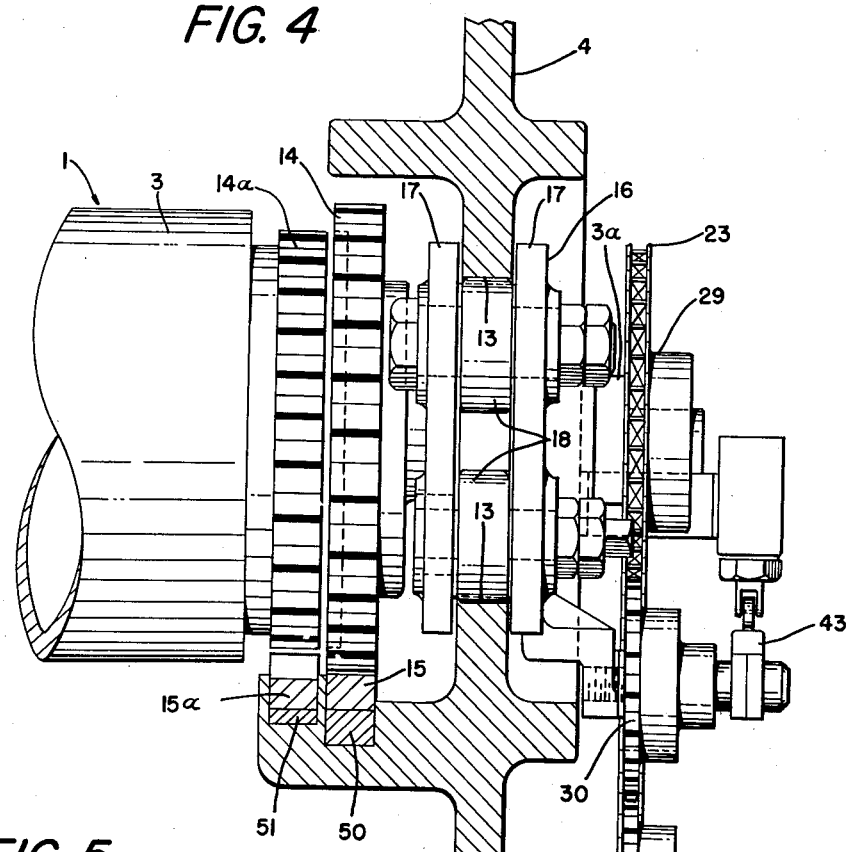
Figure 5:
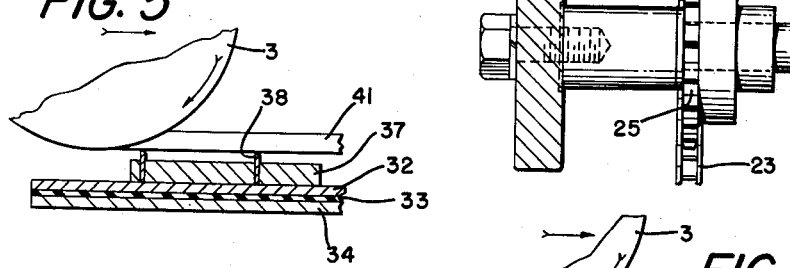
Figure 6:
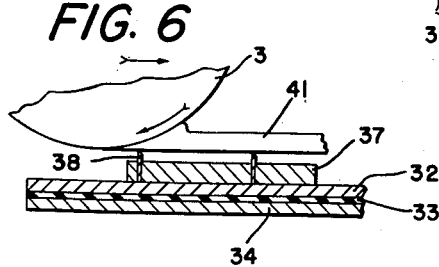
Figure 7:
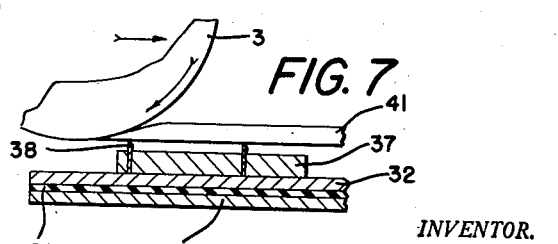

Fig. 4 is an enlarged fragmentary vertical section taken on line 4—4 of Fig. 3; and Figs. 5, 6, and 7 are fragmentary vertical sections showing, respectively, the proper cutting action of material positioned on a die carried by the apparatus of the invention, the cutting action secured with too slow a roll surface speed with relation to the movement of the roll, and the cutting action with too fast a surface speed on the roll of the apparatus.

Attention now should be had to the details of the structure shown in the drawings and wherein the roller die cutter of the invention is indicated as a whole by the numeral 1 and it includes a frame 2 that positions a hardened steel ground roll 3 thereon for rolling movement along the longitudinal axis of the frame 2 for passing over cutter dies carried by the apparatus of the invention and on which material to be cut is positioned, which material is forced against the dies by the progressive rolling movement of the roll with relation to the remainder of the apparatus.

A pair of sub-frames 4 and 5 are positioned in opposed relationship along the lateral margins of the frame 2 on the upper portions thereof. The sub-frames 5 have support posts 6 extending downwardly therefrom, with such support posts being slidably engaged with sleeve brackets 7, Fig. 3, secured to longitudinally spaced portions of the frame 2. The support posts 6 have threaded shafts or studs 8 secured thereto and extending downwardly therefrom, and lock nuts 9 engage longitudinally spaced portions of the studs 8 on opposite sides of support lugs 10 carried by the frame 2. Thus varying the positions of the lock nuts 9 on the studs 8 will correspondingly adjust the vertical relationship of the sub-frames 4 and 5 to the frame 2. Additional lock nuts 11 may engage upper portions of the studs 8 and bear on angles 12 that are secured to and extend transversely of the frame 2.

As best indicated in Fig. 3, the sub-frames 4 and 5 each have a longitudinally extending elongate opening or slot 13 provided therein for providing slideways to aid in the positioning of the roll 3 for operative action in the roller die cutter 1 of the invention.

The means used for positioning the roll 3 in the apparatus specifically include a pair of gears 14 suitably operatively secured to opposed ends of the roll 3 and with such gears 14 meshing with a pair of rack gears 15 secured in parallel relation on the different sub-frames 4 and 5 and extending longitudinally thereof. Thus on rotation of the roll 3, the engagement of the gears 14 and 15 will cause the roll 3 to move along the longitudinal axis of the roller die cutter of the invention. The end portions of the roll 3, indicated at 3a, are of reduced diameter and extend through and are suitably journalled in slide carriages 16 engaged with opposed lateral margins of the sub-frames 4 and 5, respectively, by flanges 17 on the slide carriages, as indicated in Fig. 4. These slide carriages 16 each position a plurality of rollers 18 that engage the margins of the elongate openings 13 provided in the sub-frames to provide a carriage unit engaged with each end of the roll 3 for rotatably and accurately positioning the roll 3 in the elongate openings 13 in the sub-frames for movement longitudinally of the apparatus. Hence the carriage means engaging the ends 3a of the roll 3 aid in maintaining such roll 3 accurately positioned with relation to the frame 2 as the roll is moved along the opening 13.

The drive for the roll 3 is provided by means of a conventional self-braking type of an electric motor 19 secured to a lower portion of the frame 2. The motor 19 is connected through a slip clutch 20 to a speed reducer 21 and an output sprocket 22 is provided on such speed reducer 21 and engages a sprocket chain 23 which transmits the drive to the roll 3. The chain 23 forms an endless loop and is partially positioned by means of guide sprockets 24 and 25 journalled on end portions of the sub-frame 4. An adjustable take-up sprocket 26 also engages the chain 23, with such adjustable sprocket 26 being positioned on a bracket 27 carried by a threaded shaft 28 journalled of the sub-frame 4 to move the sprocket 26 longitudinally along the sub-frame for control of tension in the chain 23.

The actual drive connection of the chain 23 with the roll end 3a is best shown in Fig. 4, and a sprocket 29 is suitably operatively carried by the exposed end of the roll 3 and engages the chain 23. The chain is retained in engagement with the sprocket 29 by a pair of guide sprockets 30 journalled on the lower portions of the slide carriage 16 on the sub-frame 4 for movement longitudinally of the sub-frames with the roll 3 and carriage assembly.

*Cutter die positioning means*

Figure 1:
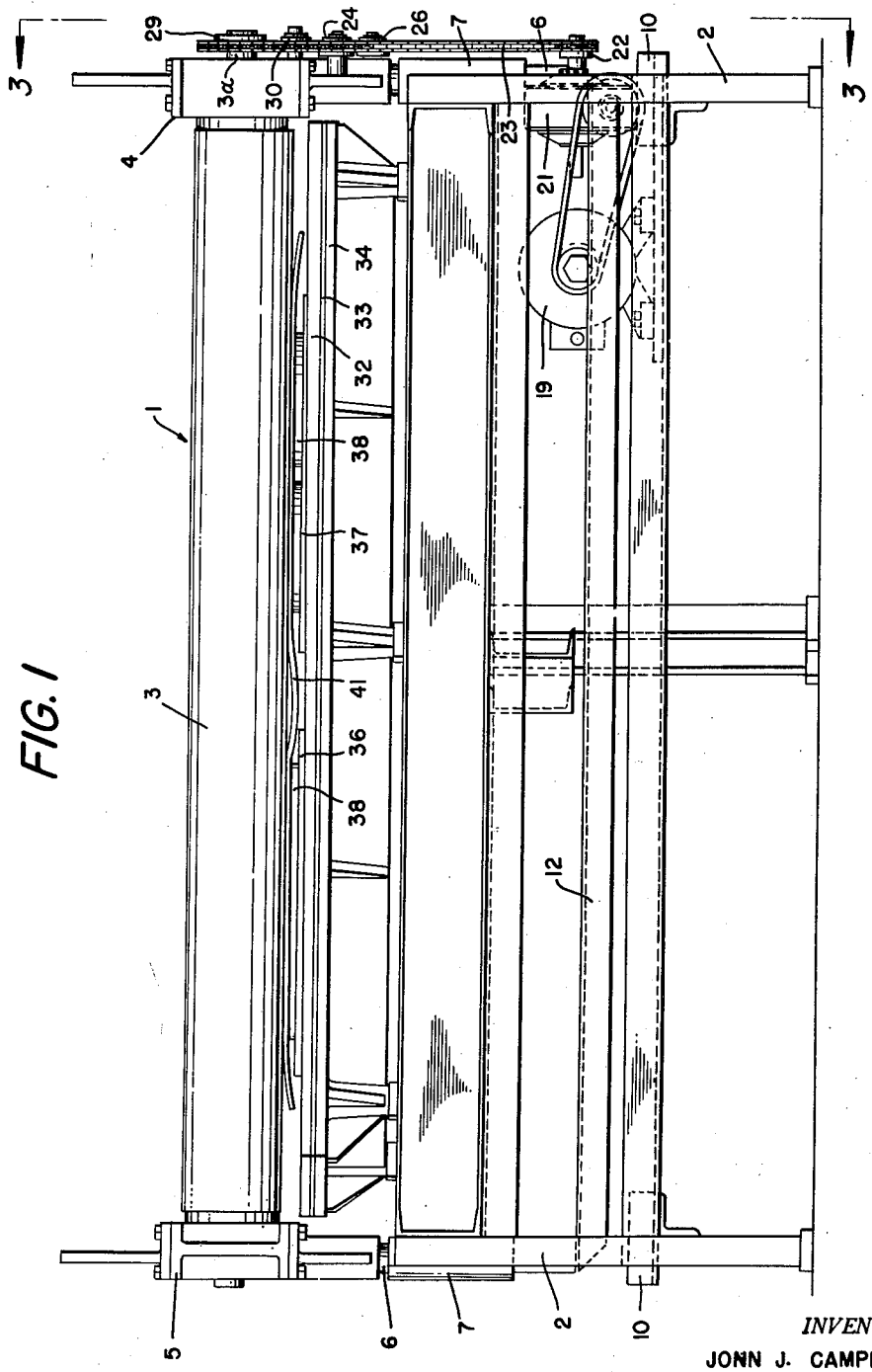
Fig. 1 is a front elevation of roller die cutting apparatus of the invention taken on line 1—1 of Fig. 3.
Figure 2:
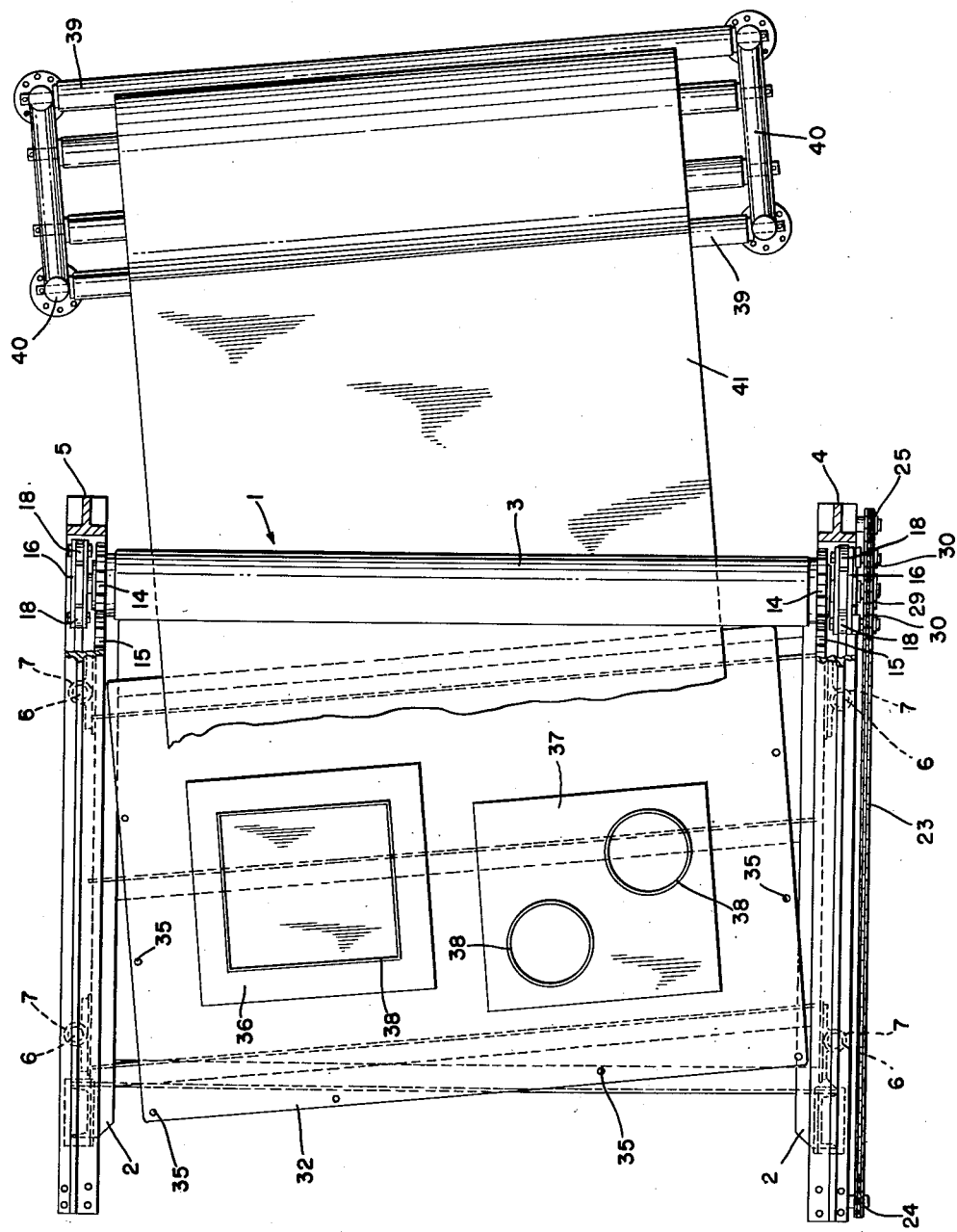
Fig. 2 is a plan, partially broken away and shown in section, of the apparatus of the invention and material feeding means associated therewith.

Fig. 2 of the drawings best shows that a die receiving top plate 32 is associated with the frame 2 intermediate the lateral margins thereof and such plate usually is ground to have a hard flat surface. Figs. 5 through 7 best show that the top plate 32 is positioned on a layer or sheet 33, made from rubber or other suitable resilient material, and with such layer 33 being carried by and supported on a flat metal base plate 34 suitably secured to and supported on the frame 2 in a fixed manner. Fig. 2 also clearly shows that the top plate 32 is spaced laterally from the marginal edges of the apparatus and from the adjacent sub-frames 4 and 5. Hence if necessary, suitable clamps (not shown) can be used for securing cutter dies to such top plate 32. If desired, the cutter dies may be bolted or screwed to the top plate 32 by engaging bolts or similar means with the cutter dies and with holes 35 provided at desired portions of the top plate 32.

Figs. 2, and 5 through 7 indicate that any desired type of cutter dies, such as cutter dies 36 and 37, may be positioned on and supported by the top plate 32. These dies 36 and 37 include base plates which have metal strips 38 engaged with and supported by the base portions of the dies with such metal strips 38 being positioned on their edges and with the upper edges of the strips being sharpened to provide cutting surfaces for the die.

As best indicated in Fig. 2, it will be noted that the longitudinal axis of the top plate 32 is positioned at an angle of from about 5° to 10° with the longitudinal axis of the frame 2 so that such longitudinal axis of the top plate is likewise at an angle to the direction of movement of the roll 3 as it rolls along the frame parallel to the longitudinal axis thereof. It has been found that such positioning of the top plate permits dies to be placed thereon, which dies have relatively long straight, transversely directed cutting edges therein and with such straight edges of the dies being positionable at an angle to the roller by squaring the dies with relation to the top plate 32. Hence a scissors-like progressive shearing action can be secured on material placed on the die to have a gradual cutting action progressively effected thereon as the roll 3 moves longitudinally of the frame 2 of the apparatus.

A suitable support means, such as plurality of rollers 39 carried on a frame 40 positioned adjacent the roller die cutter 1, may carry a roll of foam rubber or the like from which a sheet of rubber 41 is lead into and through the apparatus of the invention to be pressed against the dies 36 and 37 for cutting desired shapes from such rubber sheet 41 as the roll 3 is moved along the frame 2.

As an important feature of the present invention, it should be noted that the roll 3 has a larger outer diameter than the pitch diameter of the gear means 14 operatively engaged with the ends of the roll 3. This larger diameter of the roll causes a greater speed on the surface of the roll, as the roll is rotating, than the actual longitudinal movement of the roll along the frame 2. For example, the roll in one type of apparatus had a diameter of 7.060" and the pitch diameter of the gears 14 were 7.000". Thus only a few thousandths of an inch per inch of roll diameter difference gave very desirable results. It appears that the roll 3 may be from about .003" to about .008" larger per inch of diameter than the pitch diameter of the gear means 14.

Fig. 5 shows the cutting action secured by use of the apparatus of the invention when the roll 3 is moving at a slightly greater peripheral speed than the longitudinal motion of the roll 3 due to the rack gears 15 and associated means positioning the roll 3. Fig. 6 shows the cutting action secured on the sheet 41 or other means being cut if the roll 3 does not have a sufficiently high surface speed in relation to the forward movement of the roll so that a bunch of material is built up underneath the advancing portion of the roll as the roll is passing over the die 37. Likewise, Fig. 7 shows the opposite effect on the rubber layer 41 when the roll 3 has too great a surface speed with relation to the progressive or forward movement of the roll 3 in that a somewhat too great stretching action is secured on the rubber sheet as the roll is moved longitudinally of the apparatus.

It should be understood that as a general rule the thicker the material to be cut the faster the rotary speed of the roll 3 in relation to its forward movement. The object to be achieved is to insure a vertical cut on the material. When the roll 3 is not turning fast enough, as in Fig. 6, or is turning too fast, as in Fig. 7, angular and not vertical cuts are achieved. To make a true vertical cut it is necessary that the roll 3 turn at a speed so that lines on the top and bottom of the material and in vertical alignment engage simultaneously between the roll 3 and the edge of the die.

The invention contemplates the provision of mechanism for controllably varying the rotary speed of roll 3, and while such mechanism may take a variety of forms; one embodiment of which is shown in Fig. 4 of the drawings. A second gear 14ᵃ, of smaller pitch diameter than gear 14, is mounted adjacent gear 14, and the gear 14ᵃ has a rack 15ᵃ associated with it. Each of the racks 15 and 15ᵃ has a serrated series of wedging surfaces on its bottom side which engage with complemental wedging surfaces on longitudinally adjustable wedge bars 50 and 51. Thus, either rack 15 can be moved into engagement with gear 14 (as shown), or rack 15ᵃ can be moved into engagement with gear 14ᵃ upon longitudinal movement of wedge bars 50 and 51. Disengaging rack 15 from gear 14 and engaging rack 15ᵃ with gear 14ᵃ results in a faster rotary drive to roll 3 as is advisable in operations upon thicker materials. Obviously, additional gears could be incorporated to provide additional speeds.

Any conventional control means are provided for use with the roller die cutter 1 of the invention, and usually such means would include the motor 19, a reversing starter for the motor 19 and suitable controls are provided for the motor so that it can be readily operated to drive the roll 3 longitudinally of the frame in either direction, as desired. The motor is the self-braking type so that it will not overrun after the energy supply therefore has been terminated.

As a safety precaution, suitable limit switches, such as switch 42 indicated in Fig. 3, are provided at each end of the frame 2. A cam 43 or other actuating member is positioned by the carriage assembly and is adapted to engage the switch 42 and turn off the motor 19 so that the roll 3 is not moved farther longitudinally of the frame 2 than is proper for safe operation of the apparatus. A similar limit switch (not shown) is usually provided at the opposite end of the apparatus.

It will be noted that the dies used in association with the apparatus of the invention can be made from relatively inexpensive materials, such as plywood bases and cutting rule die stock forming the cutting strips.

From the foregoing, it is contended that a novel type of roller die cutter apparatus has been provided by the invention, which apparatus has desirable properties for cutting patterns from one or more layers of material placed on the apparatus. The apparatus is adjustable to various thicknesses of material to be cut and cuts of uniform, contour with practically normal edge faces on all cut surfaces are secured by use of the apparatus of the invention. The machine is adapted to operate with a minimum of supervision, or operators and large number of items of accurate cut and size can be rapidly provided by the apparatus. Thus it is contended that the objects of the invention have been achieved.

While one complete embodiment of the invention has been disclosed herein, it will be appreciated that modification of this particular embodiment of the invention may be resorted to without departing from the scope of the invention as defined in the appended claims.

I claim:

1. In roller cutter die apparatus, a frame, a sub-frame at each lateral margin of said frame, means for adjusting the vertical positions of said sub-frames with relation to said frame, said sub-frames having longitudinally extending elongate slots therein, a roller, carriage means engaging said elongate slots in said sub-frame to be accurately positioned thereby and engaging said roller to position said roller and hold it fixedly with relation to movement normal to said slots, means for positioning dies on said frame, and means for moving said roller along said frame and for rotating said roller as it is so moved.

2. Die cutter means comprising a ground hardened steel roll, gear means on the ends of said roll, a frame, rack gears positioned on said frame for engaging said gear means on said roll, a sprocket operatively engaging one end of said roll, a chain means engaging said sprocket, means for driving said chain means to rotate said roll and move it along said rack gears and said frame, a top plate die holder on said frame and having a flat top surface and transverse axis at an angle with relation to the axis of said roll slightly different from 90° for progressively engaging said roll as it is moved along said frame, slide way and roller means operatively engaging said roll to aid in maintaining said roll fixedly and accurately positioned with relation to said top plate die holder as said roll is moved along said frame, and means for adjusting the position of said slide way and roller means in a direction normal to the plane defined by the top surface of said top plate die holder.

3. In roller die cutter apparatus, a roller, gear means on the ends of said roller, rack means for engaging said gear means and means engaging said roller to rotate it and cause positive rolling of said gear means along said rack means, said roller having an outer diameter a small fraction of an inch larger than the pitch diameter of said gear means whereby the periphery of said roller will move at a greater surface speed than said roller surface is moved longitudinally over the work material to produce a wiping and improved cutting action by said roller when used to press the material against a die for cutting action thereon.

4. In apparatus as in claim 3, a roller which has a diameter larger than the pitch diameter of said gear means by about three thousandths of an inch for each inch of roll diameter.

5. The combination in apparatus for cutting rubber sheets and the like of a die having an upwardly directed thin cutting edge and on which the sheet to be cut is adapted to rest, a hard-surfaced metal roller, means for effecting relative movement between the die and roller to cut the sheet between the roller and the die, means for positively driving the roller in a rotary direction to provide a surface speed somewhat greater than the relative speed of movement between the roll axis and the die, and means for adjusting the rotary speed driving means to achieve substantially a vertical cut.

6. Die cutter means comprising a hard surfaced metal roll, gear means on the ends of said roll, a frame, die means carried by said frame for engaging said roller to cut material on said die means, rack gears positioned on said frame for engaging said gear means on said roll, means for rotating said roll to move it positively along said rack gears and said frame, and additional positioning means operatively engaging said roll to maintain said roll accurately positioned with relation to said die means as said roll is moved along said frame, said roller having a diameter of from about .003" to about .008" per inch of diameter larger than the diameter of said gear means whereby the periphery of said roller moves faster with relation to said die means than said roller moves along said frame.

7. Die cutter means comprising a hard surfaced metal roll, gear means on the ends of said roll, a frame, die means defining a plane and carried by said frame for engaging said roller to cut material on said die means, rack gears positioned on said frame for engaging said gear means on said roll, means positioning said roll with relation to said die means to prevent any movement normal to the plane of said die means, and means for rotating said roll to move it positively along said rack gears and said frame, said roller having a diameter of from about .003" to about .008" per inch of diameter larger than the diameter of said gear means whereby the periphery of said roller moves faster with relation to said die means than said roller moves along said frame.

8. The combination in apparatus for cutting sheets of a die having a cutting edge lying in a plane and on which the sheet to be cut is adapted to rest, a roller, means for effecting positive and fixed relative movement between the die and roller to cut the sheet between the roller and the die on rotation of said roller, means for positioning said roller to prevent movement thereof normal to the plane of said die cutting edge, and means for positively driving the roller in a rotary direction to provide a surface speed therefor somewhat greater than the relative speed of movement between the roll axis and the die to obtain a wiping and cutting action between the surface of said roller and the cutting edge of said die.

9. In roller die cutter apparatus, a frame, a roller unit including a roll with gears on the ends thereof, rack means extending along said frame for engaging said gears to move said roll along said frame normal to the longitudinal axis thereof, die positioning means on said frame having a transverse axis at an angle of about 80° to 85° to the longitudinal axis of said frame, positive acting drive means engaging said roller unit to rotate it and cause rolling of said roller unit along said rack means, the periphery of said roll of said roller unit rotating at a slightly greater speed than said roller unit as it moves along said rack means, and means for maintaining said roller unit and said roll in a fixed path of movement with relation to said frame as said roller unit is moved therealong, said roll exerting a wiping progressive cutting action on material on a die on said die positioning means.

10. The combination in apparatus for cutting foam rubber sheets and other materials of a die having a cutting edge and on which the sheet to be cut is adapted to rest, means for supporting said die, a roller positioned to engage said die, a plurality of gear means forming a unit with said roller, stationary rack gear means extending the length of said die for engagement with different gears of said first named gear means to vary the relative movement of the roller along said rack gear means with relation to the rotational speed of said roller and thus the relative movement between said die and roller for cutting the sheet between said roller and die on rotation of said roller, and means for rotating said roller to cause movement of said roller over and with relation to said die.

References Cited in the file of this patent
UNITED STATES PATENTS

| | | |
|---|---|---|
| 472,715 | Rogowski | Apr. 12, 1892 |
| 2,088,686 | Blanchard | Aug. 3, 1937 |
| 2,170,646 | Rosenberg | Aug. 22, 1939 |
| 2,171,482 | Rosenberg | Aug. 29, 1939 |
| 2,186,594 | Rosenberg | Jan. 9, 1940 |
| 2,217,060 | Korsen | Oct. 8, 1940 |
| 2,217,977 | Arbogast | Oct. 15, 1940 |
| 2,651,366 | Ide | Sept. 8, 1953 |

FOREIGN PATENTS

| | | |
|---|---|---|
| 670,171 | Germany | Jan. 13, 1939 |